US007215845B1

(12) United States Patent
Chan et al.

(10) Patent No.: US 7,215,845 B1
(45) Date of Patent: May 8, 2007

(54) OPTICAL INTERCONNECT ARCHITECTURE

(75) Inventors: James K. Chan, Rancho Palos Verdes, CA (US); Birendra Dutt, Westchester, CA (US)

(73) Assignee: Apic Corporation, Culver City, CA (US)

( * ) Notice: Subject to any disclaimer, the term of this patent is extended or adjusted under 35 U.S.C. 154(b) by 0 days.

(21) Appl. No.: 11/336,441

(22) Filed: Jan. 20, 2006

(51) Int. Cl.
*G02B 6/293* (2006.01)
*G02B 6/36* (2006.01)

(52) U.S. Cl. .................. 385/24; 385/15; 385/53; 385/134

(58) Field of Classification Search .............. 385/14, 385/15, 24, 49, 50, 53, 88, 89, 134, 135, 385/144; 398/164
See application file for complete search history.

(56) References Cited

U.S. PATENT DOCUMENTS

| 5,144,691 | A * | 9/1992 | August et al. ............... 385/88 |
| 6,304,690 | B1 * | 10/2001 | Day ............................ 385/24 |
| 6,452,700 | B1 * | 9/2002 | Mays, Jr. ..................... 359/15 |
| 6,845,184 | B1 * | 1/2005 | Yoshimura et al. ......... 385/14 |
| 2005/0047795 | A1 * | 3/2005 | Windover et al. .......... 398/164 |

* cited by examiner

*Primary Examiner*—Quyen Leung
(74) *Attorney, Agent, or Firm*—Hogan & Hartson LLP

(57) ABSTRACT

An optical interconnect architecture provides three dimensional optical interconnects, with the optical interconnects provided along a plane such as a wafer or a substrate. One or more integrated circuits is provided on a second "electronic" plane that is spaced from the optical interconnect plane. Signals from the circuit on the electronic plane are coupled to the optical interconnect plane using various strategies, including metal or optical interlayer interconnects extending perpendicular to the optical plane. Once on the optical interconnect plane, the signals from the circuits on the electronic plane are propagated optically.

10 Claims, 3 Drawing Sheets

OPTICAL INTERCONNECT ARCHITECTURE

BACKGROUND

1. Field of the Invention

The present invention relates to optical-electronic systems in which optical interconnects are used to distribute signals to or between one or more integrated circuit devices.

2. Description of the Related Art

Many modern integrated circuits are reaching limits on heat generation and adequate signal propagation, at least in part due to problems with interconnects. Advanced microprocessors are a good example. Signals are often carried within advanced microprocessors using copper wiring lines having lateral dimensions of substantially less than one micron. The resistance and density of these lines and the current carried by these lines are sufficient to make the interconnects a significant source of heating in the integrated circuit. Power dissipation and the increased margins required by excessive operating temperatures are problems for current integrated circuits and future circuit development is threatened by these problems.

A different problem arises from the close spacing between the wiring lines and the dielectric constant of the insulating material between the wiring lines. The close spacing of wiring lines and the high dielectric constant of the dielectric material between the wiring lines leads to high levels of interline capacitive and inductive coupling. The capacitive and inductive coupling are another source of undesirable heating, with the consequent heat dissipation and higher operating temperatures causing a range of problems. A more significant problem is that these capacitive and inductive couplings limit the propagation speeds of these wiring lines and lead to signal distortions that can prevent signals from being recognizable to receiving circuits.

The problems that have arisen in integrated circuits have also arisen in larger systems. Switching speeds for buses in computer systems are getting high, so that motherboards for computer systems are exhibiting heating and signal distortion problems like those discussed above with respect to integrated circuits.

Optical interconnects have been used to a limited extent in current electronic circuits. For example, optical isolation devices are frequently used in mixed signal applications including in modems. These applications have been in specialized areas and have not lead to the widespread use of optical interconnect technology. In addition, there has recently been some suggestions of exchanging signals between chips using optical interconnect technology. These proposed applications are for "edge" interconnects, where the optical interconnects replace the leads and circuit board connections used to communicate between chips. These proposed optical interconnect technologies have not lead to the widespread adoption of optical interconnect technology in electronic systems.

Optical circuit technology has advanced considerably in recent years due to the increased prevalence of optical networks and switches. These advancements have produced optical multiplexers, modulators, detectors, in-line amplifiers and switches. Waveguides on various substrates have become widely available. Despite these advancements, electronic and optical circuits have not been integrated.

SUMMARY OF THE PREFERRED EMBODIMENTS

An aspect of the present invention provides an optical and electronic system, comprising an optical interconnect plane and an electronic plane. The optical interconnect plane includes a plurality of optical channels extending along a plane of the optical interconnect plane. The electronic plane includes first and second electronic circuits. First and second interlayer interconnects respectively couple signals to and from the first and second electronic circuits to the optical interconnect plane. A modulator on the optical interconnect plane receives signals from the first electronic circuit and modulates an optical signal in response to signals from the first electronic circuit and couples the optical signal to one of the optical channels. A receiver on the optical interconnect plane is coupled to the one of the optical channels to receive the optical signal and converts the optical signal into electronic signals coupled to the second electronic circuit on the electronic plane.

DETAILED DESCRIPTION OF THE PREFERRED EMBODIMENTS

Figure 1:
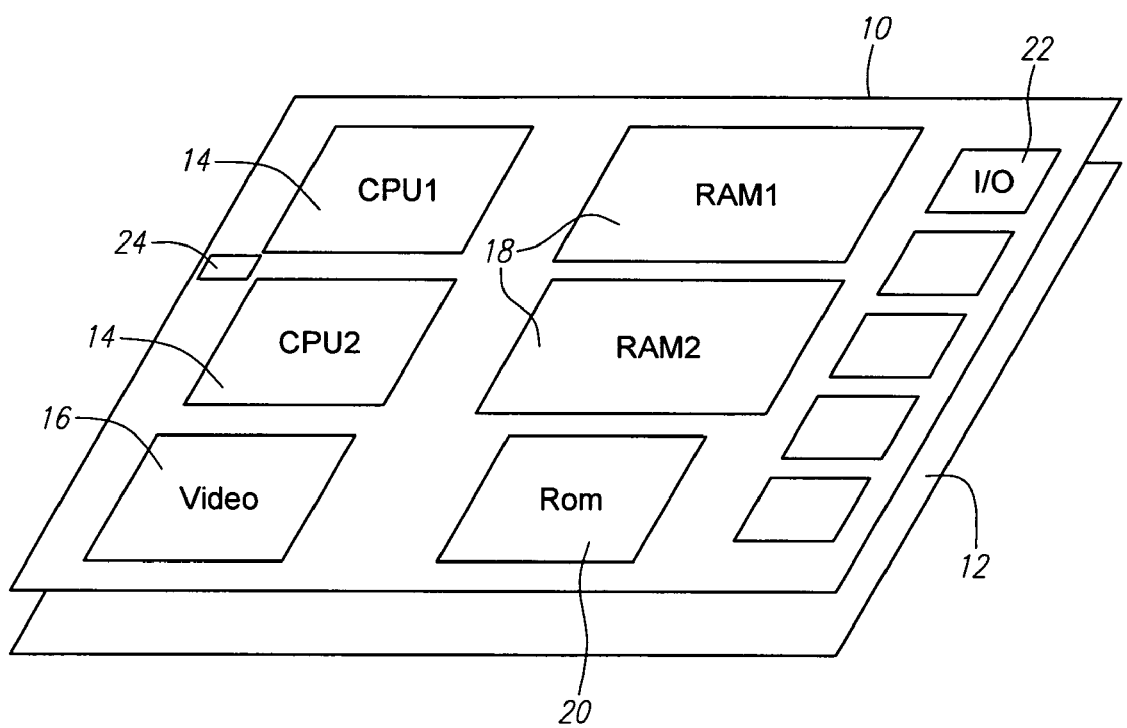
FIG. 1 illustrates a multichip assembly forming an electronic plane and an optical interconnect plane.

Preferred implementations of the present invention provide an optical interconnect architecture, a strategy and a related method in a system including integrated circuit logic or storage devices. The optical interconnect architecture may provide a mechanism for distributing clock signals to different parts of a circuit and may alternatively or additionally provide a mechanism for exchanging other signals in circuits. Different scales of circuits may benefit from the interconnect architecture described here. For example, a set of optical interconnects may be provided to carry signals over portions of a single chip integrated circuit device such as a microprocessor. As another example, a set of optical interconnects may be provided to carry signals between and within two chips or a group of chips such as might be conventionally provided on a circuit board such as the motherboard of a computer. On yet another scale of implementation, a set of optical interconnects may be provided so as to provide backplane interconnects between a plurality of circuit boards such as might be used in a large scale switch.

Preferred embodiments of the present invention provide optical interconnects in a manner that can avoid a number of problems in conventional, direct electrical interconnect strategies. Mutual capacitance and mutual inductance are not problems for optical distribution of signals and avoiding these problems has a number advantages. For example, the optical interconnect architecture and strategy described here can reduce heating effects as compared to conventional signal distribution architectures and strategies. In addition, signals including clock signals can be distributed so that the delivered signals have lower levels of distortion and so that the signals have predictable propagation times that are not sensitive to propagation distances on the scale of the systems described here.

By providing clock signals at a more predictable time and with a substantially undistorted waveform, an optical interconnect architecture according to the present invention allows the integrated circuits that communicate through the optical interconnect architecture to operate most like their ideal, predicted operational characteristics. Fewer allowances have to be made to accommodate uncertainties in timing or signal values. This allows for simpler and more accurate circuit models and automated design software to be used in the design of complex integrated circuits. In addition, the architecture has advantages in the basic distribution or transfer of data signals in that parallel signals arrive with more accurate alignment and so preferred implementations provide a synchronous data path. For serial signals, the successive signal components arrive at more precise times in preferred implementations. These benefits are independent of whether or not the signals are clock signals and whether or not clock signals are distributed according to this architecture. Either parallel or serial signals benefit from the lower levels of waveform distortion. The greater timing or alignment accuracy arises because, in the preferred architecture, the optical paths are defined by lithography and so are highly uniform and predictable. Of course, the optical paths are not subject to inductive or capacitive coupling.

An optical interconnect architecture according to the present invention preferably provides a three dimensional architecture for interconnects, with the optical interconnects provided along a plane such as might be defined by a wafer, substrate or a circuit board. In such a preferred implementation, one or more integrated circuits may be provided on a second "electronic" plane that is generally parallel to the plane of the optical interconnect plane. Signals can be exchanged between the integrated circuits of the electronic plane and the optical interconnect plane using various strategies. Signals from the electronic plane can be provided over metal or optical interlayer interconnects extending perpendicular to the optical plane. A mixture of optical and metal interlayer connections can be used in other embodiments. Once signals are provided from the electronic plane to the optical interconnect plane, the signals propagate optically through the optical interconnect plane. Signals are converted from electronic signals to optical signals as they pass from the electronic plane to the optical plane and then are converted again when the signals are passed from the optical plane back to the electronic plane.

In preferred implementations, the optical and electronic planes are defined according to typical manufacturing strategies. From this perspective, the interconnects for a single microprocessor would be considered a single electronic plane. In another implementation, the interconnects to either surface of a multilayer circuit board and the interconnects to the integrated circuits mounted to the circuit board can be considered a single electronic plane. Optical interconnect planes are also defined according to typical manufacturing strategies. In some cases optical interconnects formed as waveguides on a silicon wafer might be considered a plane. In other implementations, a set of polymer waveguides provided on a substrate might be considered an optical interconnect plane.

It should be noted that the optical interconnect plane will often include passive elements, such as planar waveguides, but might include active elements such as detectors, sources and modulators as well. In other instances, detectors, sources and modulators might be provided on the electronic plane instead of on the optical interconnect plane, with optical interlayer interconnects such as waveguides, fibers or channels provided to couple optical signals from the optical plane to the electronic plane. The latter configuration is typical when the interlayer interconnects are optical in nature.

In another implementation, the optical interconnect architecture and strategy can include an optical interconnect plane and a plurality of electronic planes at fixed orientations to the optical interconnect plane. For example, a plurality of electronic planes in the form of circuit boards might be provided with the electronic planes generally parallel to one another and all disposed at an angle to the optical plane. Other implementations may include a plurality of optical interconnect planes and a plurality of electronic interconnect planes.

FIG. 1 illustrates one implementation of an optical interconnect architecture and strategy according to the present invention. The upper plane 10 is an electronic plane and the lower plane 12 is an optical interconnect plane. The illustrated upper electronic plane 10 may be a wafer scale substrate having a plurality of chips including one or more microprocessors 14, a video processor 16, one or more volatile memories 18, one or more non-volatile memories 20, input/output circuitry 22 and a master system clock 24. Alternatively, the same or another assortment of chips 14, 16, 18, 20, 22 and 24 might be mounted on a multilayer circuit board to provide the upper, electronic plane 10. The master system clock chip 24 provides one or more master clock signals that are distributed to all of the chips on the electronic plane 10.

Figure 2:
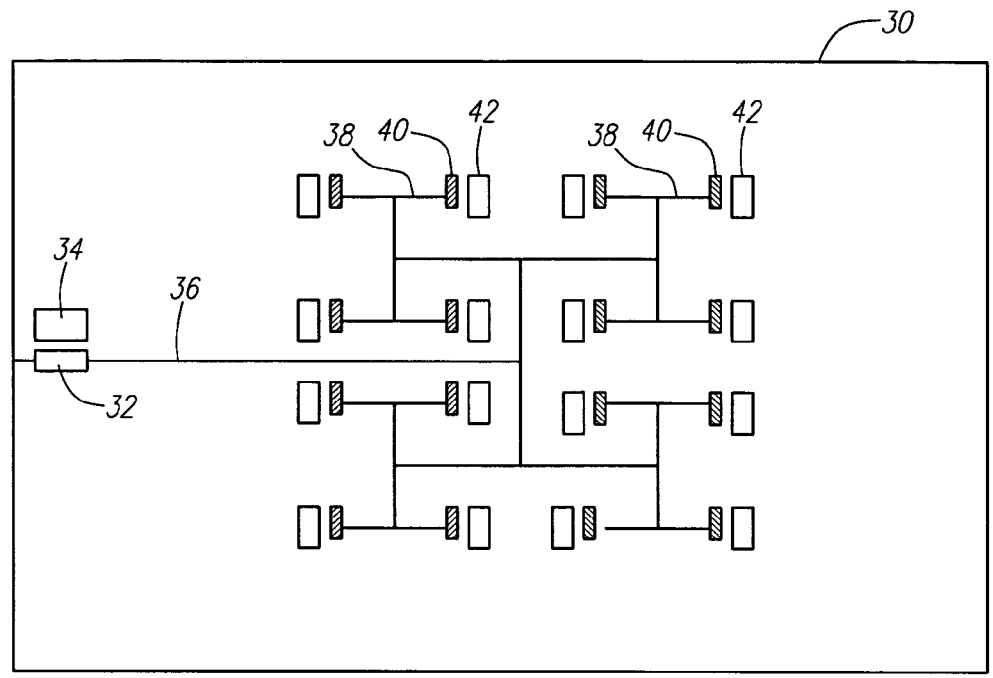
FIG. 2 illustrates in plan view an optical clock distribution chip that can be used in place of the optical interconnect plane illustrated in FIG. 1.

FIG. 2 illustrates in plan view an optical clock distribution chip 30 that can be used as the optical interconnect plane 12 illustrated in FIG. 1. When the FIG. 2 optical clock distribution chip is used with the electronic plane shown in FIG. 1, the FIG. 2 optical interconnect plane preferably distributes one or more clock signals as desired to each of the chips 14, 16, 18, 20 and 22 shown in FIG. 1 as part of the electronic plane 10. Clock signals are generated by the master clock chip 24 and provided over an interconnect, typically a metal interconnect, to the optical plane. The electronic clock signals are received and converted into optical signals that are distributed over the optical plane to positions on the optical plane that are near the positions on the electronic plane where the clock signals are to be provided. At least theoretically the master clock generator can be provided on the optical plane, but that is typically not a preferred implementation. This is because the clock signals from the master clock chip 24 are programmable and can be adapted to different conditions such as providing a sleep mode for the system. The optical interconnect plane 30 includes a germanium modulator 32 and the modulator's drive electronics 34. Signals are provided from the master clock circuit 24 over a metal interconnect to the modulator's drive electronics, which convert the clock signals from the chip 24 to electronic signals that drive the modulator to modulate an optical signal distributed over the optical plane. In the illustrated preferred implementation, the optical plane 30 is a silicon on insulator substrate in which silicon oxide or other waveguide channels are defined.

The modulator 32, which may be a silicon, silicon-germanium, germanium, polymer or other modulator, modulates an optical signal, such as the output of a light emitting diode or a laser, according to a timing and waveform desired for the clock signal, as defined by the master clock chip 24 on the electronic plane. The modulator 32 outputs a modulated optical signal along a waveguide 36 that distributes the modulated optical signal to a plurality of waveguide branches and down to a branch waveguide like that illustrated at 38. In some embodiments the modulator is not a discrete element and may be implemented with a light source or a waveguide. The branch waveguide 38 couples the optical signal modulated with the desired one or more clock signals into a metal-semiconductor-metal (MSM) detector 40 formed near or at the end of the waveguide branch 38. Preferably the MSM detector 40 uses germanium so that it is readily compatible with the typical optical signal wavelength and waveguide characteristics. Other materials and detectors are known and can be used. Receiver electronics 42 are coupled to the MSM detector 40 to condition and amplify the electronic signal output by the MSM detector 40 and responsive to the modulated optical signal received by the MSM detector 40. Receiver electronics 42 drive the converted optical signal over a metal interlayer interconnect to the electronic plane, where the clock signal is received and used by corresponding circuits or chips on the electronic plane.

As shown, the FIG. 2 optical interconnect plane provides a distributed set of clock signals at the outputs of the collection of receiver electronics units 42 at various positions over the surface of the optical interconnect plane. Most preferably the conditioned and converted electrical signal output by the receiver electronics 42 has the characteristics desired for a clock signal to be used by one or more chips of the electronic plane 10 shown in FIG. 1. Due to the optical propagation paths through which the optical clock signals are primarily carried, the clock signals output from the receiver electronics 42 are closely synchronized in time and have essentially identical waveforms. In such preferred implementations, the electrical clock signals output by the receiver electronics 42 are provided along metal interlayer interconnects to the chips on the electronic plane. The metal interlayer interconnects are preferably short and all of substantially the same length in the propagation direction. Most preferably, at least one electrical clock signal derived from the optical interconnect plane is provided to each of the chips on the electronic plane to maintain a consistent clock signal across the system.

Figure 3:
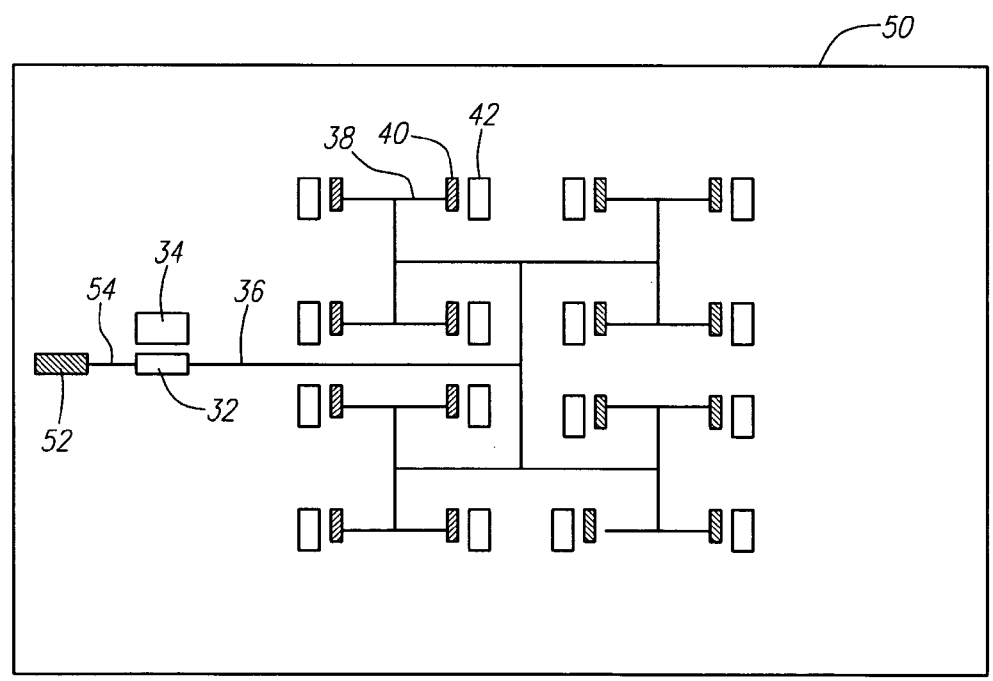
FIG. 3 illustrates in plan view a modification of the FIG. 2 optical interconnect plane.

FIG. 3 illustrates another implementation of an optical interconnect plane 50 that might also be used with an electronic plane like that illustrated in FIG. 1. As was the case with FIG. 2, when the FIG. 3 optical interconnect plane 50 is used with an electronic plane 10 like that illustrated in FIG. 1, the FIG. 3 optical interconnect plane preferably receives the master clock signals from the master clock chip 24 and distributes the master clock signals through the optical interconnect plane before the signals are again provided to the electronic plane 10. In this way the electronic plane 10 first provides from the master clock chip 24 and then receives from the optical interconnect plane 50 one or more clock signals for the chips on the electronic plane 10. The received clock signals, propagated over metal interlayer interconnects, are provided at the positions desired for use by the chips or circuits on the optical interconnect plane.

The FIG. 3 optical interconnect plane 50 has many components that are the same as or similar to the FIG. 2 optical interconnect plane 30. These similar components are designated by the same reference numbers in FIG. 3 as in FIG. 2 and are not discussed further here. The substrate for the optical interconnect plane 50 is preferably a silicon on insulator (SOI) substrate, but other substrates and other waveguide configurations can be used. The planarity and stability of the silicon on insulator substrate is advantageous for manufacturing and for providing a uniform interconnect length. The FIG. 3 optical interconnect plane differs from the FIG. 2 optical interconnect plane in that the FIG. 3 optical interconnect plane 50 includes a light source 52 and light guide 54 that generates and distributes the light used to distribute the clock signals within the optical interconnect plane. Note that the light source may incorporate a modulator, as would be possible if the light source were a VCSEL (vertical cavity surface-emitting laser) device.

Light source 52 may be a diode laser or a light emitting diode or other appropriate source. In a particularly preferred implementation, light source 52 is a silicon based Raman laser formed on or in the SOI plane 50 or an evanescent laser in which gain materials are provided in a silicon waveguide. Such lasers are particularly advantageous because they can be efficiently integrated with the optical interconnect plane. The output of light source 52 is coupled to the germanium modulator through a waveguide 54 provided within the SOI substrate.

Figure 4:
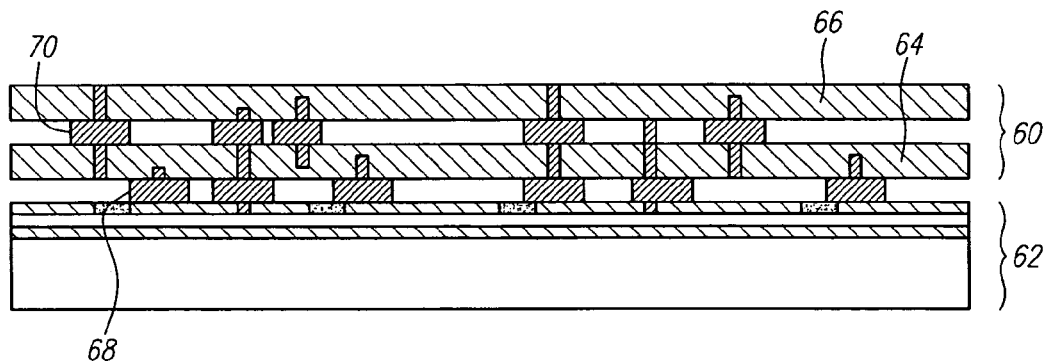
FIG. 4 illustrates in cross-section a combination of an electronic plane and an optical interconnect plane.

FIG. 4 illustrates in cross-section two electronic planes 60 coupled to an optical interconnect plane 62 and shows the vertically extending interlayer interconnects between the electronic and optical planes. Optical interconnect plane 62 includes, for example, a silicon on insulator substrate with waveguides and passive and active devices formed on the substrate as illustrated in FIGS. 2 and 3. FIG. 4 illustrates two electronic planes 64, 66 in a stacked configuration. The electronic planes 64, 66 may, for example, be two different CMOS devices such as two different CMOS microprocessors. As another example, the two electronic planes 64, 66 may be different types of storage (for example, flash memory and DRAM) in a stacked configuration as has become commercially significant in some applications. In still other implementations, the two electronic planes 64, 66 may be wafer scale substrates or circuit boards with chips mounted on the substrates or boards.

When the optical interconnect architecture of the present invention is implemented using the structure illustrated in FIG. 4, clock signals or other signals are generated on one or another of the electronic planes 64, 66 and are provided over metal interconnects such as the illustrated interlayer interconnects 68, 70 to the optical interconnect plane 62. Preferably the signals from one or both of the electronic planes 64, 66 are converted to optical signals on the optical interconnect plane 62 and distributed on the optical interconnect plane 62 to desired positions on the optical interconnect plane. The optical signals are preferably converted at the desired positions to electronic signals that are propagated over vertical interlayer interconnects such as those indicated at 68, 70 to desired chips or circuits on the electronic planes 64, 66. As discussed above, the signals distributed in this way can be master clock signals or other types of signals.

Figure 5:
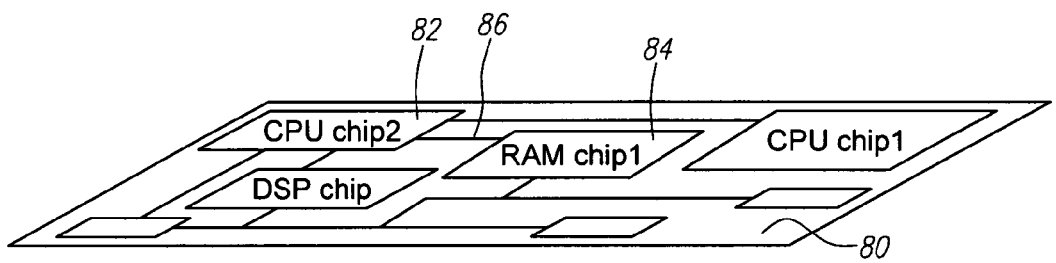
FIG. 5 illustrates a system in which a set of integrated circuit chips are mounted directly on an optical waveguide substrate.

FIG. 5 shows another embodiment of the present invention, in which the optical plane is a silicon on insulator motherboard 80 and various chips 82, 84 are mounted directly on the SOI motherboard 80. In this embodiment, signals are exchanged between chips in the system through the optical interconnect plane defined by the SOI motherboard 80. Electronic signals are output through metal interconnects between the chips such as 82, 84 and circuitry within the SOI motherboard 80. Circuits within the optical interconnect plane convert the electronic signals from the chips 82, 84 into optical signals and distribute them through waveguides such as 86 on the SOI motherboard 80. Signals distributed to near the chips 82, 84 are then converted into electronic signals and provided through metal interconnects, such as indium bumps, I/O pins, copper-to-copper bonding, etc., between the SOI motherboard 80 and the chips 82, 84 to the chips 82, 84. Systems that can utilize this architecture can provide very high speed operation.

Figure 6:
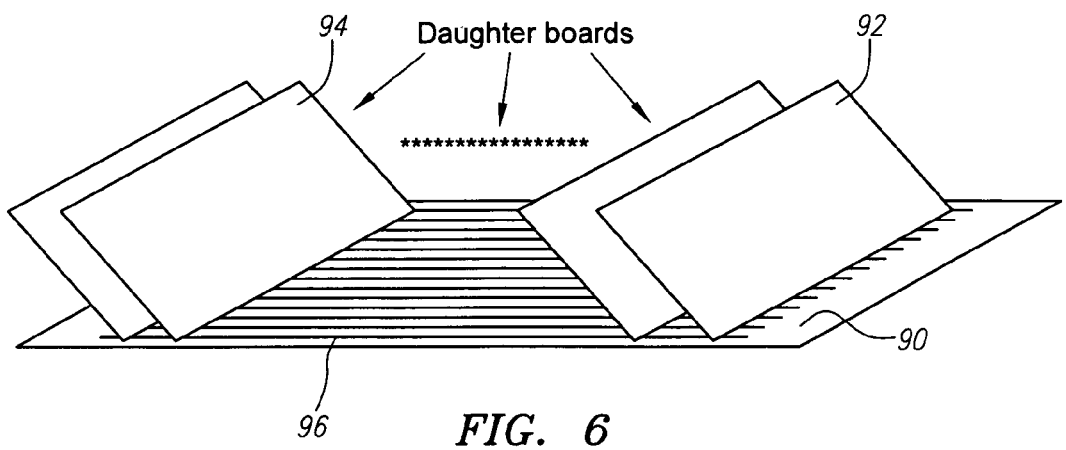
FIG. 6 illustrates an application of aspects of the present invention to a backplane or shared bus interconnect architecture.

Another aspect of the present invention is illustrated in FIG. 6, which shows an optical interconnect plane architecture for a backplane interconnect or shared bus architecture. An optical interconnect backplane 90 is provided for a number of similar electronic planes 92, 94. Such architectures are used in some large scale switches, routers and in computer systems such as mainframe computers. An optical bus 96 having a number of waveguide bus lines couples the various electronic boards 92, 94 through the optical interconnect plane 90. Signals are converted from the electronic boards 92, 94 into optical signals that are distributed over the optical bus lines 96, with the optical signals from the bus 96 converted at the electronic boards 92, 94 back into electronic signals.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

What is claimed:

1. An optical and electronic system, comprising:
   an optical interconnect plane comprising a plurality of optical channels extending along a plane of the optical interconnect plane;
   an electronic plane comprising first and second electronic circuits;
   first and second interlayer interconnects for respectively coupling signals to and from the first and second electronic circuits to the optical interconnect plane;
   a modulator on the optical interconnect plane coupled to receive signals from the first electronic circuit, the modulator modulating an optical signal responsive to signals from the first electronic circuit, the optical signal coupled to one of the optical channels; and
   a receiver on the optical interconnect plane coupled to the one of the optical channels to receive the optical signal, the receiver converting the optical signal into electronic signals coupled to the second electronic circuit on the electronic plane.

2. The system of claim 1, wherein the first electronic circuit is a master clock circuit.

3. The system of claim 2, wherein the second electronic circuit is a microprocessor.

4. The system of claim 2, wherein the second electronic circuit is a memory.

5. The system of claim 2, wherein the second electronic circuit is a DSP.

6. The system of claim 1, wherein the optical interconnect plane provides a synchronous data path.

7. The system of claim 1, wherein the first and second interlayer interconnects are metal.

8. The system of claim 1, wherein the first and second interlayer interconnects comprise one or more of indium bumps, I/O pins and copper-to-copper bonds.

9. The system of claim 1, wherein the optical interconnect plane comprises a silicon on insulator substrate.

10. The system of claim 9, wherein the first and second electronic circuits are chips mounted on the silicon on insulator substrate.

* * * * *